US010393198B2

(12) United States Patent
Guerra Meza et al.

(10) Patent No.: US 10,393,198 B2
(45) Date of Patent: Aug. 27, 2019

(54) BRAKE ROTOR APPARATUS FOR USE WITH VEHICLES

(71) Applicant: Ford Global Technologies, LLC, Dearborn, MI (US)

(72) Inventors: Jorge Silvestre Guerra Meza, Cuautitlan Izcalli (MX); Carlos Francisco Vargas Guzmán, Nicolas Romero (MX); Jaime Antonio Sánchez Mendoza, Tlalnepantla (MX); Diego Raúl Ramírez Serrano, Ecatepec de Morelos (MX); Francisco Antonio Vargas Soria, Cuautitlan Izcalli (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/601,776

(22) Filed: May 22, 2017

(65) Prior Publication Data
US 2018/0335100 A1    Nov. 22, 2018

(51) Int. Cl.
| F16D 65/12  | (2006.01) |
| F16D 65/847 | (2006.01) |
| F16D 65/02  | (2006.01) |
| F16D 65/78  | (2006.01) |

(52) U.S. Cl.
CPC ......... *F16D 65/128* (2013.01); *F16D 65/847* (2013.01); *F16D 2065/1328* (2013.01); *F16D 2065/788* (2013.01)

(58) Field of Classification Search
CPC ............... F16D 65/128; F16D 65/847; F16D 2065/1328; F16D 2065/788

USPC ............... 188/218 XL, 264 A, 71.6
See application file for complete search history.

(56) References Cited

U.S. PATENT DOCUMENTS

| 3,171,527 | A | * | 3/1965  | Ott ......................... F16D 13/64 |
|           |   |   |         | 188/264 A |
| 3,955,650 | A | * | 5/1976  | Ellis ........................ B60T 1/062 |
|           |   |   |         | 188/18 A |
| 4,712,656 | A | * | 12/1987 | Courtois .............. H02K 49/046 |
|           |   |   |         | 188/218 XL |

(Continued)

FOREIGN PATENT DOCUMENTS

| FR | 2335742 | 7/1977 |
| GB | 2024966 | 1/1980 |

OTHER PUBLICATIONS

DBA USA, "Residual Stress, and what it means to your brakes," Rotor Tech, retrieved from http://www.dbausa.com/rotortech/ on Feb. 8, 2017, 6 pages.

(Continued)

*Primary Examiner* — Pamela Rodriguez
(74) *Attorney, Agent, or Firm* — Ray Coppiellie; Hanley, Flight & Zimmerman, LLC

(57) ABSTRACT

Brake rotor apparatus for use with vehicles are disclosed. An example apparatus includes a brake rotor having braking surfaces. The apparatus includes first fins coupled to the brake rotor and disposed between the braking surfaces. The first fins are distributed along a first radius of the brake rotor and extend radially outward. The apparatus includes second fins coupled to the brake rotor and disposed between the braking surfaces. The second fins are distributed along a second radius of the brake rotor smaller than the first radius and adjacent the first fins.

12 Claims, 8 Drawing Sheets

(56) References Cited

U.S. PATENT DOCUMENTS

| | | | |
|---|---|---|---|
| 5,427,212 A * | 6/1995 | Shimazu | B60T 5/00 |
| | | | 188/218 XL |
| 5,526,905 A | 6/1996 | Shimazu et al. | |
| 5,544,726 A * | 8/1996 | Topouzian | F16D 65/125 |
| | | | 188/218 XL |
| 5,878,848 A * | 3/1999 | Zhang | F16D 65/128 |
| | | | 188/218 XL |
| 6,260,669 B1 | 7/2001 | Daudi | |
| 6,536,564 B1 * | 3/2003 | Garfinkel | F16D 65/12 |
| | | | 188/218 XL |
| 6,796,405 B2 * | 9/2004 | Ruiz | F16D 65/12 |
| | | | 188/264 A |
| 8,251,190 B2 | 8/2012 | Gey | |
| 8,360,213 B2 * | 1/2013 | Biondo | F16D 65/12 |
| | | | 188/218 XL |
| 8,499,904 B2 * | 8/2013 | Biondo | F16D 65/12 |
| | | | 188/218 XL |
| 8,511,443 B2 * | 8/2013 | Veneziano | F16D 65/12 |
| | | | 188/218 XL |
| 9,080,625 B2 * | 7/2015 | Oberti | F16D 65/128 |
| 9,371,875 B2 * | 6/2016 | Noriega Gonzalez | |
| | | | F16D 65/847 |
| 2005/0263358 A1 | 12/2005 | Zahdeh | |

OTHER PUBLICATIONS

Streit, "Stasis Braking: Harnessing your Horsepower," Alcon Specialist Brakes & Clutches, 2012, 5 pages.

* cited by examiner

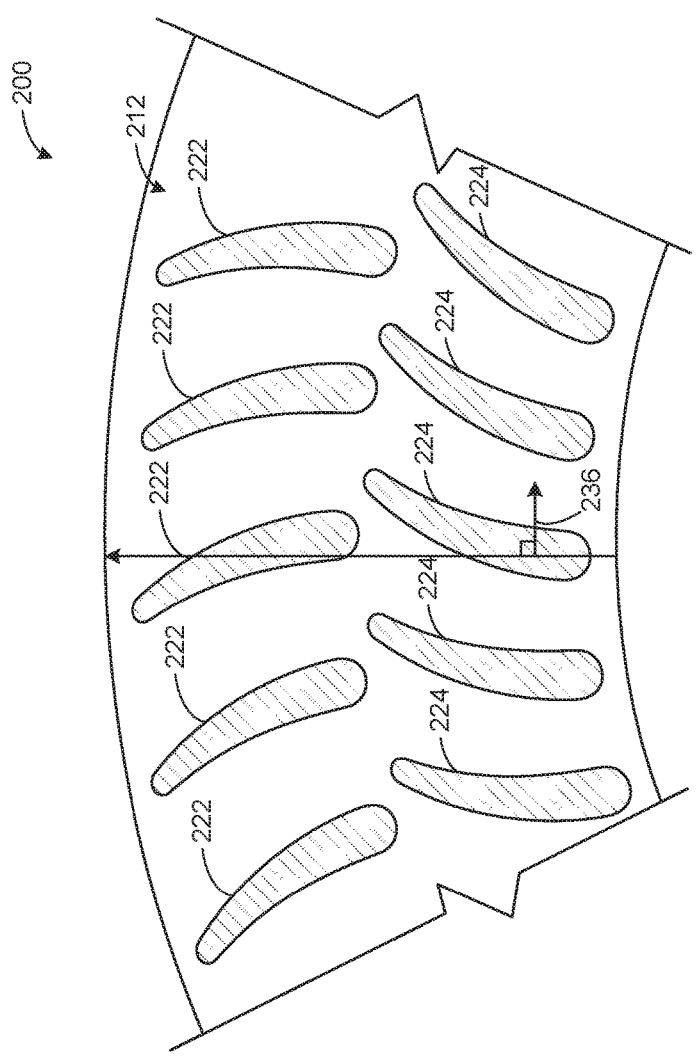

BRAKE ROTOR APPARATUS FOR USE WITH VEHICLES

FIELD OF THE DISCLOSURE

This disclosure relates generally to vehicles and, more particularly, to brake rotor apparatus for use with vehicles.

BACKGROUND

Vehicle brake systems may implement brake rotors (e.g., disc brakes) to provide braking to a vehicle. Typically, braking surfaces of the brake rotors contact or engage brake pads to generate braking forces. As the braking forces are generated, heat is transferred to the brake rotors and, thus, a temperature of the brake rotors increases during braking. After a braking operation, the temperature of the brake rotors decreases at a rate that depends on heat transfer characteristics of the brake rotors, which is partially affected by an airflow interacting with the brake rotors (e.g., convection heat transfer, etc.).

Often, to meet safety or performance criteria, the temperature of the brake rotors need to remain below a threshold temperature or within a range of temperatures during braking operations to prevent volumetric or geometric changes of the brake rotor and/or, more generally, to ensure optimal braking performance provided by the brake rotors. Many brake rotors have a gap or space between the braking surfaces to enable an airflow within the brake rotors to facilitate cooling of the brake rotors following a braking operation.

SUMMARY

An example apparatus disclosed herein includes a brake rotor having braking surfaces. The apparatus includes first fins coupled to the brake rotor and disposed between the braking surfaces. The first fins are distributed along a first radius of the brake rotor and extend radially outward. The apparatus includes second fins coupled to the brake rotor and disposed between the braking surfaces. The second fins are distributed along a second radius of the brake rotor smaller than the first radius and adjacent the first fins.

Another example apparatus includes a brake rotor having braking surfaces. The apparatus includes first fins disposed between the braking surfaces adjacent a peripheral edge of the brake rotor and configured to direct airflow radially outward from a rotational axis of the brake rotor. The apparatus includes second fins disposed between the braking surfaces and configured to direct the airflow between the first fins. The second fins are radially offset relative to the first fins.

Another example apparatus includes a brake rotor having braking surfaces. The apparatus includes first means for directing fluid between the braking surfaces coupled to the brake rotor at a first radius of the brake rotor. The first means for directing fluid extends radially outward. The apparatus includes second means for directing fluid between the braking surfaces coupled to the brake rotor at a second radius of the brake rotor smaller than the first radius. The second means for directing fluid is radially offset relative to and adjacent the first means for directing fluid.

BRIEF DESCRIPTION OF THE DRAWINGS

FIG. 2F illustrates another cross-sectional view of the example brake rotor apparatus of FIGS. 2A and 2B.

Figure 1:
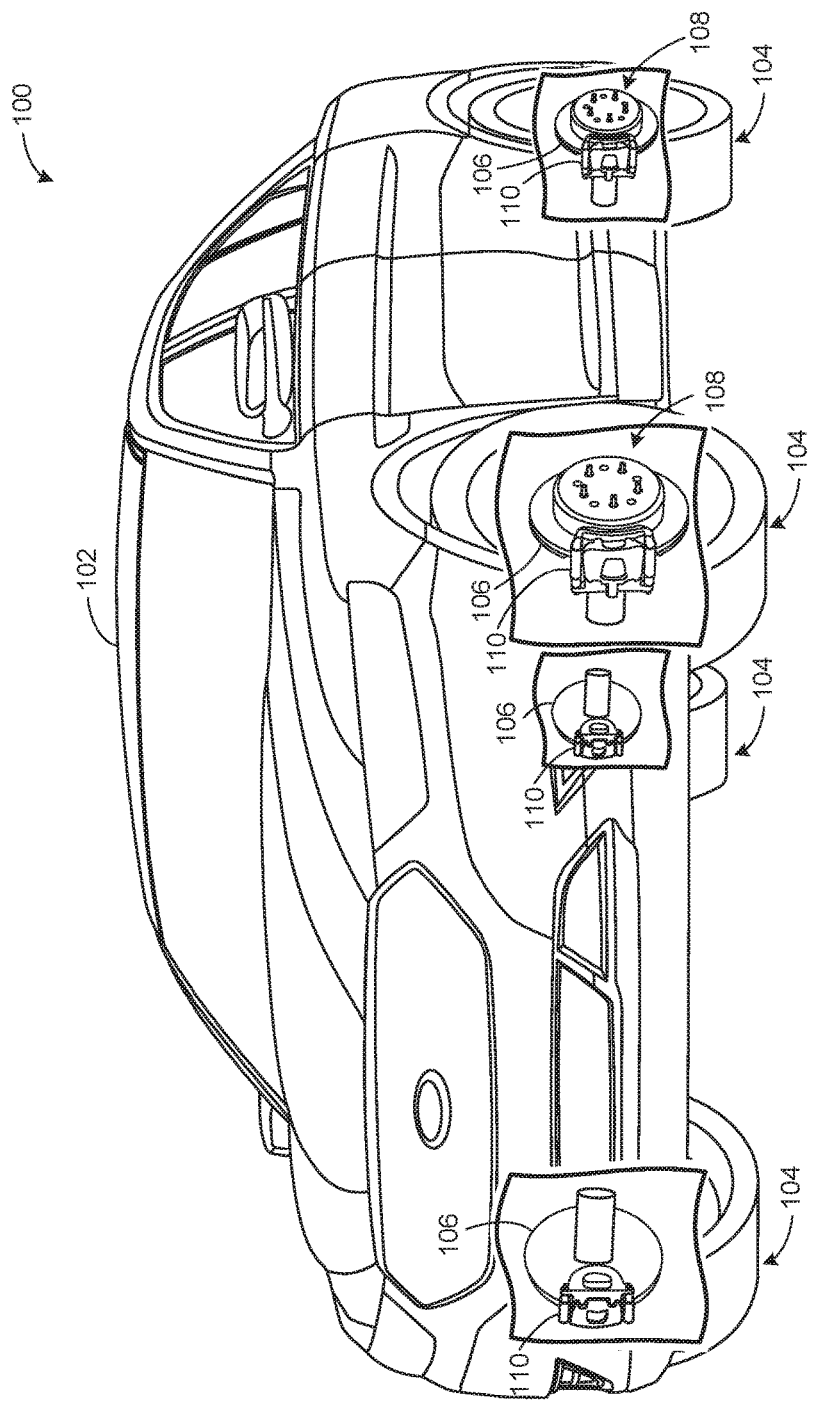
FIG. 1 is a schematic illustration of an example vehicle having example brake rotors in accordance with the teachings of this disclosure.

The figures disclosed herein are not to scale. Wherever possible, the same reference numbers will be used throughout the drawings and accompanying written descriptions to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located there between. Stating that any part is in contact with another part means that there is no intermediate part between the two parts.

DETAILED DESCRIPTION

Vehicle brake systems can implement brake rotors (e.g., disc brakes) operatively coupled to wheel assemblies of a vehicle to provide braking to the vehicle via frictional forces. Typically, brake rotors have annular braking surfaces configured to be frictionally engaged by an opposing pair of brake pads. During braking operations, the brake pads are urged (e.g., via a brake caliper) toward a brake rotor to contact and engage the braking surfaces of the rotor, thereby generating braking forces as the brake rotor rotates between the pads. As the braking forces are generated, heat is transferred to the brake rotor at relatively high rate (i.e., a heating rate) and, thus, a temperature of the brake rotor tends to increase rapidly. After the brake pads disengage the braking surfaces, heat is dissipated or transferred from the brake rotor at a lower rate (i.e., a cooling rate) and the temperature of the brake rotor tends to decrease slowly.

The rate at which a brake rotor cools depends at least partially on heat transfer characteristics provided or defined, for example, by airflow interacting with the brake rotor (e.g., convection heat transfer, etc.) and/or by components of the wheel assemblies that surround the brake rotor (e.g., radiation heat transfer, etc.). Often, to meet vehicle safety or performance criteria, the temperature of the brake rotor needs to remain within a range of temperatures or below a threshold temperature during use of the vehicle and/or during braking operations. For example, as a volumetric temperature of the brake rotor increases, dimensions of the brake rotor can increase or change in response and cause deformations of the brake rotor and/or, more generally, cause reduced performance of the brake rotor and/or braking provided to the vehicle.

Many known brake rotors may have a gap or space between the opposing braking surfaces of the rotor to enable an airflow within the brake rotor, which may increase a cooling rate of a brake rotor. Typically, vents or heat sinks are disposed between the braking surfaces to facilitate the airflow within the rotor and further increase the cooling rate of the brake rotor. However, these brake rotors can often experience undesirable characteristics associated with airflow between the braking surfaces, such as flow separation and/or a reverse flow as air travels through the brake rotor and across the fins, which can leave the brake rotor at a relatively high and/or undesired temperature during and/or following braking operations.

Examples disclosed herein increase and/or optimize heat transfer or dissipation of a brake rotor during and/or following braking operations and/or, more generally, while the brake rotor rotates. This increased heat dissipation can provide a relatively low temperature of the brake rotor during use and/or can cool or reduce a temperature of the brake rotor at a rate that would have otherwise been unattainable by using known brake rotor configurations. Additionally or alternatively, examples disclosed herein reduce and/or minimize mass of the brake rotor and, thus, may assist in reducing and/or minimizing mass of a vehicle. As will be set forth in greater detail below, the examples described herein provide fins coupled to the brake rotor and disposed between braking surfaces of the brake rotor to facilitate and/or optimize airflow within the brake rotor.

In some examples, first fins are distributed along a first radius of a brake rotor and extend radially outward. Second fins are distributed along a second radius of the brake rotor, smaller than the first radius, and adjacent the first fins. In some examples, the first fins are disposed between the braking surfaces adjacent a peripheral edge of the brake rotor and configured to direct airflow radially outward from a rotational axis of the brake rotor. In some such examples, the second fins are radially offset relative to the first fins and configured to direct the airflow between the first fins. In some disclosed examples, the first fins and/or the second fins are curved to provide a concave side of each fin that faces a direction perpendicular to a radius of the brake rotor. Additionally or alternatively, in some examples, each of the fins can include a fillet provided between the fin and the brake rotor, which can direct airflow onto the fin while the brake rotor rotates. In other disclosed examples, the first fins and/or the second fins are tapered such that each of the first fins and/or the second fins can include a width that decreases along a radially outward direction.

As will be discussed in greater detail below in accordance with the teachings of this disclosure, the fins can have various configurations and/or orientations, which may depend on a type of vehicle on which the rotors are used and/or characteristics associated with air flowing into the brake rotor of the vehicle. In examples disclosed herein, these configurations and/or orientations can be advantageously changed or altered to optimize airflow through the brake rotor and/or onto the fins, which can further increase or maximize the cooling rate of the brake rotor.

FIG. 1 is a schematic illustration of an example vehicle 102 that may implement the teachings of this disclosure. The example vehicle 102 has one or more wheel assemblies 104. The vehicle 102 can be a car, a van, a truck, etc. In the illustrated example of FIG. 1, the vehicle 102 includes four wheel assemblies 104. In other examples, the vehicle 102 can include additional or fewer wheel assemblies 104. In any case, each of the wheel assemblies 104 includes a respective brake rotor (e.g., a disc brake) 106 coupled to the wheel assemblies 104 via fasteners (e.g., lugs, bolts, nuts, etc.) 108, and/or any other suitable fastening method or technique, such that wheel assemblies 104 and their corresponding brake rotors 106 can rotate in tandem.

In the illustrated example of FIG. 1, the vehicle 102 includes brake calipers 110 coupled to one or more of the wheel assemblies 104 to provide braking to the vehicle 102.

For example, during braking operations of the vehicle 102, the brake calipers 110 cause brake pads (not shown) to engage the brake rotors 106 to decelerate the vehicle 102. As the brake calipers 110 cause the brake pads to engage the brake rotors 106, friction and heat are generated between the brake calipers 110 and the brake rotors 106. Thus, during braking operations, temperatures of the brake rotors 106 tend to increase rapidly at a heating rate (e.g., 10 kilowatts, 100 kilowatts, etc.) associated with the brake rotors 106. After braking operations cease and/or the brake calipers 110 disengage the pads from the brake rotors 106, heat is dissipated and/or transferred from the brake rotors 106 and the temperatures of the brake rotors 106 tend to decrease at a cooling rate (e.g., −1 kilowatt, −10 kilowatts, etc.) associated with the brake rotors 106. Typically, a magnitude (e.g., an absolute value) of the cooling rate of the brake rotors 106 is less than a magnitude of the heating rate, which may cause the temperatures of the brake rotors 106 to remain at relatively high values for a duration of time after a braking operation has ended.

The heat dissipated and/or transferred from the brake rotors 106 can depend on one or more heat transfer characteristics associated with the brake rotors 106 such as heat transfer coefficients (e.g., a conduction coefficient, a convection coefficient and/or a radiation coefficient). These heat transfer characteristics are provided or defined, for example, by airflow interacting with the brake rotors 106 (e.g., convection heat transfer, etc.) and/or by components of the wheel assemblies 104 that surround the brake rotors 106 (e.g., radiation heat transfer, etc.), in addition to other sources that may affect the heat transfer characteristics. Generally, as values of the heat transfer coefficients increase, the rate at which heat is dissipated and/or transferred from the brake rotors 106 tends to increase in response.

As the temperatures of the brake rotors 106 change, properties and/or dimensions of brake rotors 106 can change. For example, as a volumetric and/or an average temperature of a brake rotor 106 increases, dimensions of the brake rotors 106 can increase or expand in response. In another example, as surface temperatures of the brake rotors 106 increase, friction coefficients provided by the brake pads engaging the brake rotors 106 can change, which may negatively affect braking forces provided to the vehicle 102 and/or overall performance of the brake rotors 106 during braking operations. These changes of properties and/or dimensions can be undesirable and generally cause a reduced performance of the brake rotors 106, the brake calipers 110 and/or braking provided to the vehicle 102.

Figure 2A:
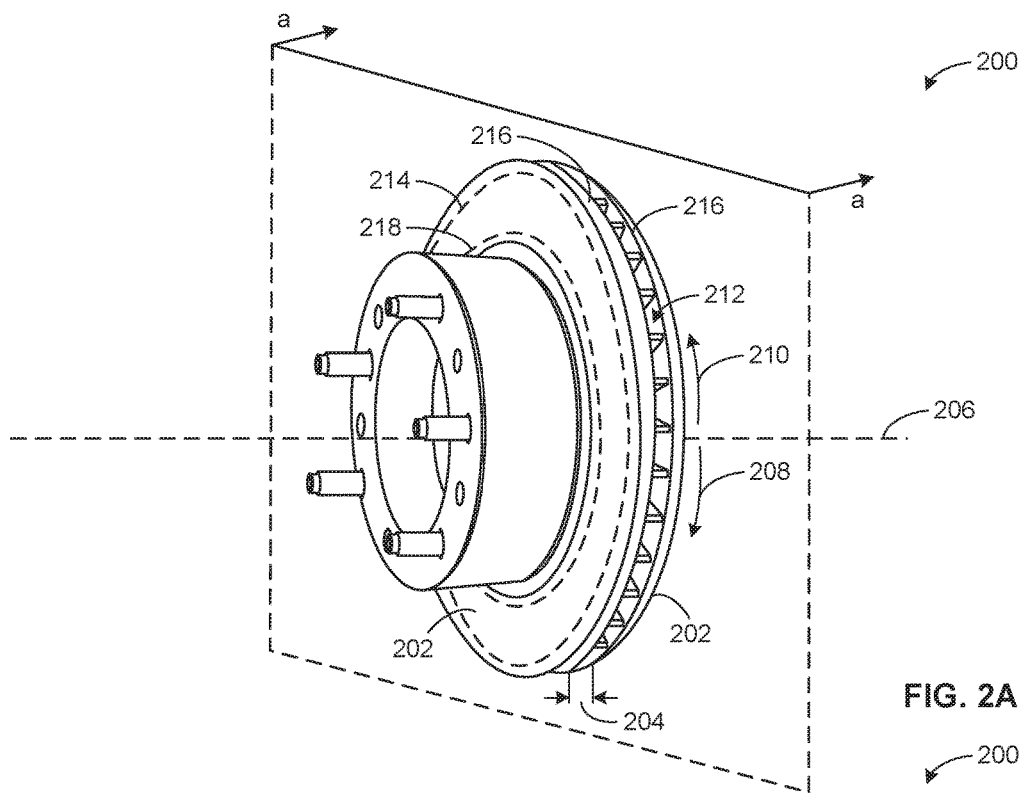
FIGS. 2A and 2B illustrate an example brake rotor apparatus in accordance with the teachings of this disclosure.
Figure 2B:
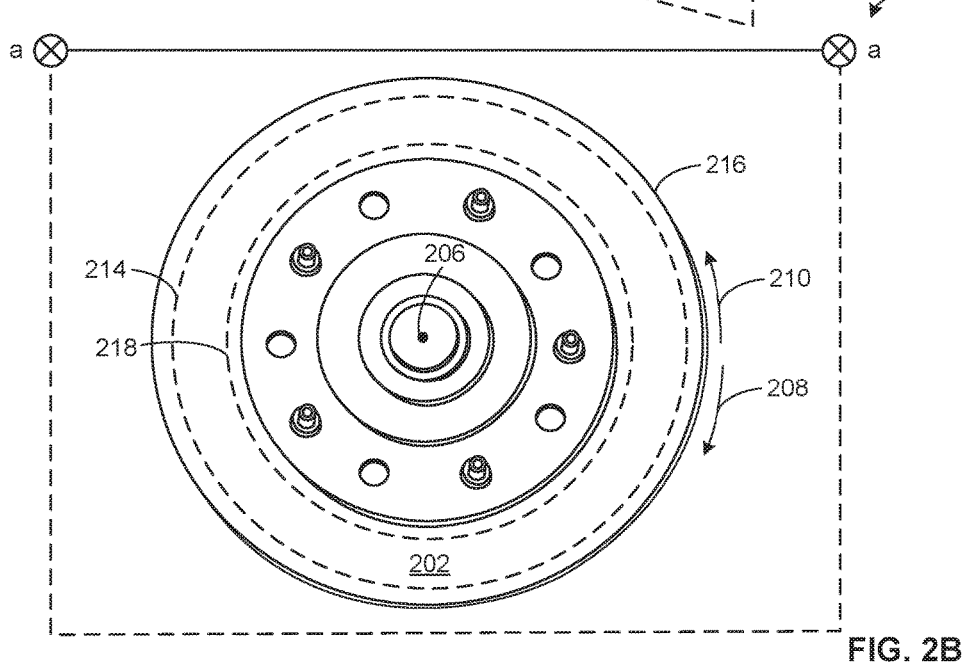

FIGS. 2A and 2B illustrate example brake rotor apparatus 200 to implement the examples disclosed herein. In some examples, the vehicle 102 of FIG. 1 can implement the example brake rotor apparatus 200. In the illustrated examples of FIGS. 2A and 2B, the example brake rotor apparatus 200 includes opposing braking surfaces 202 to receive means for engaging the braking surfaces 202. For example, the means for engaging the braking surfaces 202 can include the brake calipers 110 of FIG. 1. Generally, as the brake pads engage the braking surfaces 202 during braking operations, friction and/or heat is provided to the brake rotor apparatus 200. In some such examples, a temperature of the braking surfaces 202 and/or an overall or average temperature of the brake rotor apparatus 200 increases as the friction and/or heat is provided by the means for engaging the brake rotor apparatus 200.

In the illustrated examples of the FIGS. 2A and 2B, the brake rotor apparatus 200 includes a recessed area or gap 204 between the braking surfaces 202 to enable a fluid (e.g., air) to flow between the braking surfaces 202, which may affect one or more heat transfer characteristics associated with the brake rotor apparatus 200. During braking operations and/or use of the brake rotor apparatus 200, the brake rotor apparatus 200 rotates relative to a rotational axis 206 in a first rotational direction 208 or a second rotational direction 210, opposite the first rotational direction 208, which can facilitate the flow of the fluid within the gap 204. The brake rotor apparatus 200 includes means for directing fluid between the braking surfaces 202 disposed in the gap 204 and/or between the braking surfaces 202 to facilitate and/or direct a flow of the fluid while the brake rotor apparatus 200 rotates in the first rotational direction 208 or the second rotational direction 210. For example, the means for directing fluid can include one or more fins (e.g., one or more airfoils and/or extended surfaces) 212 coupled to the brake rotor apparatus 200 and distributed between the braking surfaces 202 to direct airflow out of and/or away from the brake rotor apparatus 200, which is explained in greater detail below in connection with FIGS. 2C, 2D, 2E, 2F, 2G and 3. In other examples, the means for directing fluid can be one or more bosses and/or protrusions having any suitable shape or geometry to deflect and/or direct a fluid as the bosses and/or protrusions move relative to the fluid. The bosses and/or protrusions can be made from any suitable material having a strength to withstand centripetal acceleration and/or fluid forces acting on the bosses and/or protrusions as the brake rotor apparatus 200 rotates.

As will be discussed in greater detail below, the means for directing fluid and/or the fins 212 of the brake rotor apparatus 200 can be positioned and/or distributed relative to one or more radii of the brake rotor apparatus 200. For example, the brake rotor apparatus 200 includes a first radius (represented by the dashed lines) 214 that may be located near or at peripheral edges 216 of the brake rotor apparatus 200. Additionally or alternatively, in this example, the brake rotor apparatus 200 includes a second radius 218, smaller than the first radius 214, that may be located near the rotational axis 206.

Figure 2C:
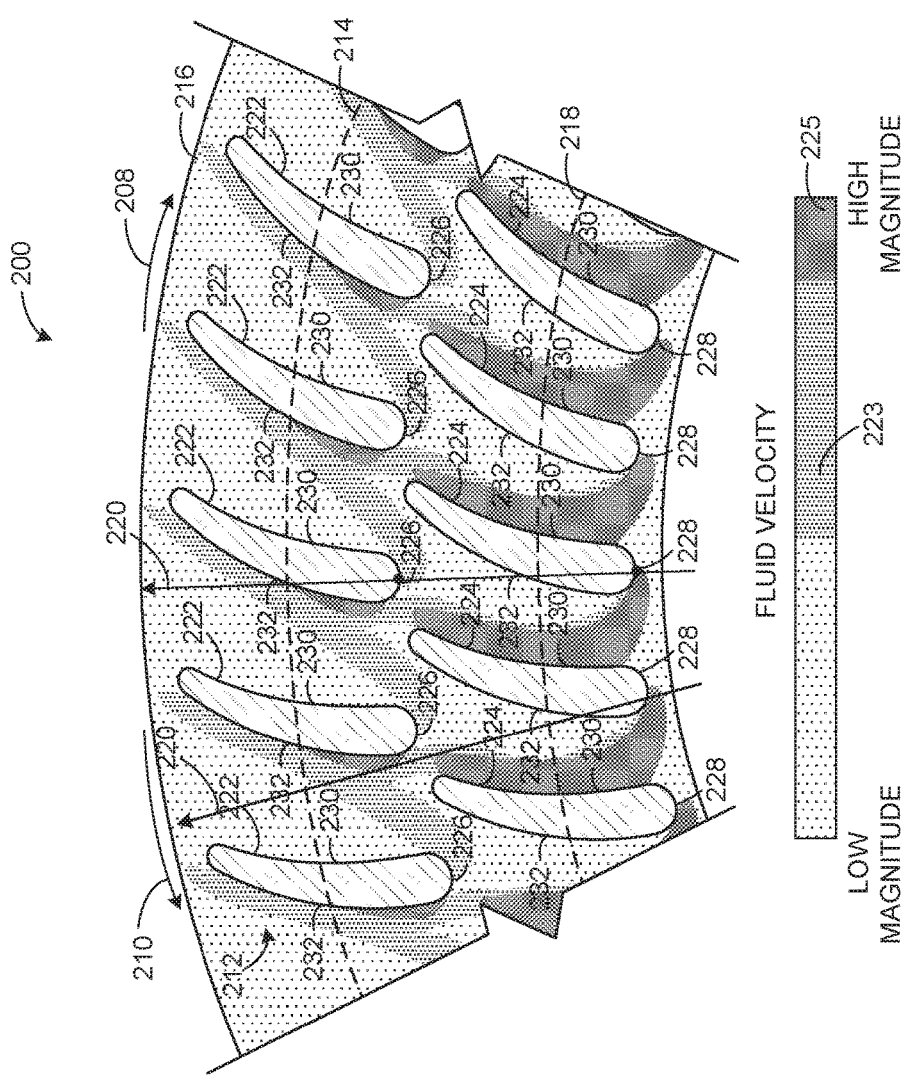
FIGS. 2C, 2D, and 2E illustrate cross-sectional views of the example brake rotor apparatus of FIGS. 2A and 2B and show airflow behavior through the example brake rotor apparatus.

FIG. 2C illustrates a cross-sectional view of the example brake rotor apparatus 200 of FIGS. 2A and 2B and shows the fins 212 configured to direct airflow (as represented by the granular shading in FIG. 2C) along a radially outward direction and/or a radial line 220 relative to the rotational axis 206 (not shown) as the brake rotor apparatus 200 rotates in either the first rotational direction 208 or the second rotational direction 210. As mentioned above, the cooling rate of the brake rotor apparatus 200 can depend on heat transfer characteristics associated with the brake rotor apparatus 200. For example, as the fluid and/or airflow within the brake rotor apparatus 200 contacts and/or interacts with surfaces of the fins 212, a convection heat transfer coefficient associated with the fins 212 is provided, in addition to a conduction heat transfer coefficient and/or a radiation heat transfer coefficient. In some examples, the convection heat transfer coefficient provides approximately 90% of the total heat transfer capabilities of the brake rotor apparatus 200. The convection heat transfer coefficient is affected by properties and/or parameters (e.g., a flow rate, a temperature, a density, a viscosity, airflow velocity, etc.) of the fluid and/or airflow within the brake rotor apparatus 200 and between the braking surfaces 202 (not shown). Generally, as a magnitude of the flow rate and/or velocity of the fluid and/or airflow increases across the surfaces of the fins 212, the convection heat transfer coefficient increases and, thus, the cooling rate of the brake rotor apparatus 200 increases. As heat is dissipated or transferred from the surfaces of the fins 212 to the fluid and/or airflow (e.g., via convection heat transfer), a temperature of the braking surfaces and/or an overall or average temperature of the brake rotor apparatus 200 tends to decrease in response.

In the illustrated example of FIG. 2C, first fins 222 (e.g., first means for directing fluid between the braking surfaces 202) are distributed along the first radius 214 of the brake rotor apparatus 200 and extend radially outward and/or, in other words, extend along the radial line 220. In this example, each of the first fins 222 is adjacent one or both of the peripheral edges 216 of the brake rotor apparatus 200 and is configured to direct airflow radially outward and/or along the radial line 220, as represented by a medium density 223 associated with the granular shading of FIG. 2C. In some examples, at least some of the first fins 222 are not adjacent the peripheral edge(s) 216. The first fins 222 have a first spacing between each of the first fins 222 and relative to the first radius 214. In this example, the first fins 222 are spaced regularly relative to the first radius 214. That is, the first spacing between each of the first fins 222 is the same. In other examples, the first fins 222 can be irregularly spaced and/or, in other words, where the first spacing between each of the first fins 222 is not the same.

Additionally or alternatively, in the illustrated example of FIG. 2C, second fins (e.g., second means for directing fluid between the braking surfaces 216) 224 are distributed along the second radius 218 of the brake rotor apparatus 200 and extend radially outward and/or along the radial line 220. In this example, the second fins 224 are adjacent the first fins 222 and configured to direct the airflow onto and/or between the first fins 222, as represented by a high density 225 and/or the medium density 223 associated with the granular shading of FIG. 2C. In this example, each of the first fins 222 extends partially between a respective pair of the second fins 224. The second fins 224 have a second spacing between each of the second fins 224 and relative to the second radius 218. The second fins 224 can be regularly or irregularly spaced relative to the second radius 218. In this example, the second spacing between each of the second fins 224 is smaller than the first spacing associated with the first fins 222.

In the illustrated example of FIG. 2C, the second fins 224 can be radially aligned and/or radially offset relative to the first fins 222. When the second fins 224 are radially aligned with the first fins 222, each of the second fins 224 shares a position with each of the first fins 222 on one or more common radial lines 220. For example, each inner end 226 of the first fins 222 shares a position on and/or are aligned along the radial line 220 with a corresponding inner end 228 of the second fins 224 (i.e., the inner ends 226 of the first fins 222 are radially aligned with the inner ends 228 of the second fins 224). In other examples, the second fins 224 can be radially offset relative to the first fins 222. For example, when each of the second inner ends 228 does not share a position on and/or is not aligned along one or more common radial lines 220 with each of the corresponding first inner ends 226, the second fins 224 are radially offset relative to the first fins 222. In this example, at least a portion of each of the second fins 224 does not share a position and/or are not aligned along the radial line 220 with any portion of the first fins 222 (i.e., the second fins 224 are radially offset relative to the first fins 222).

Figure 2D:
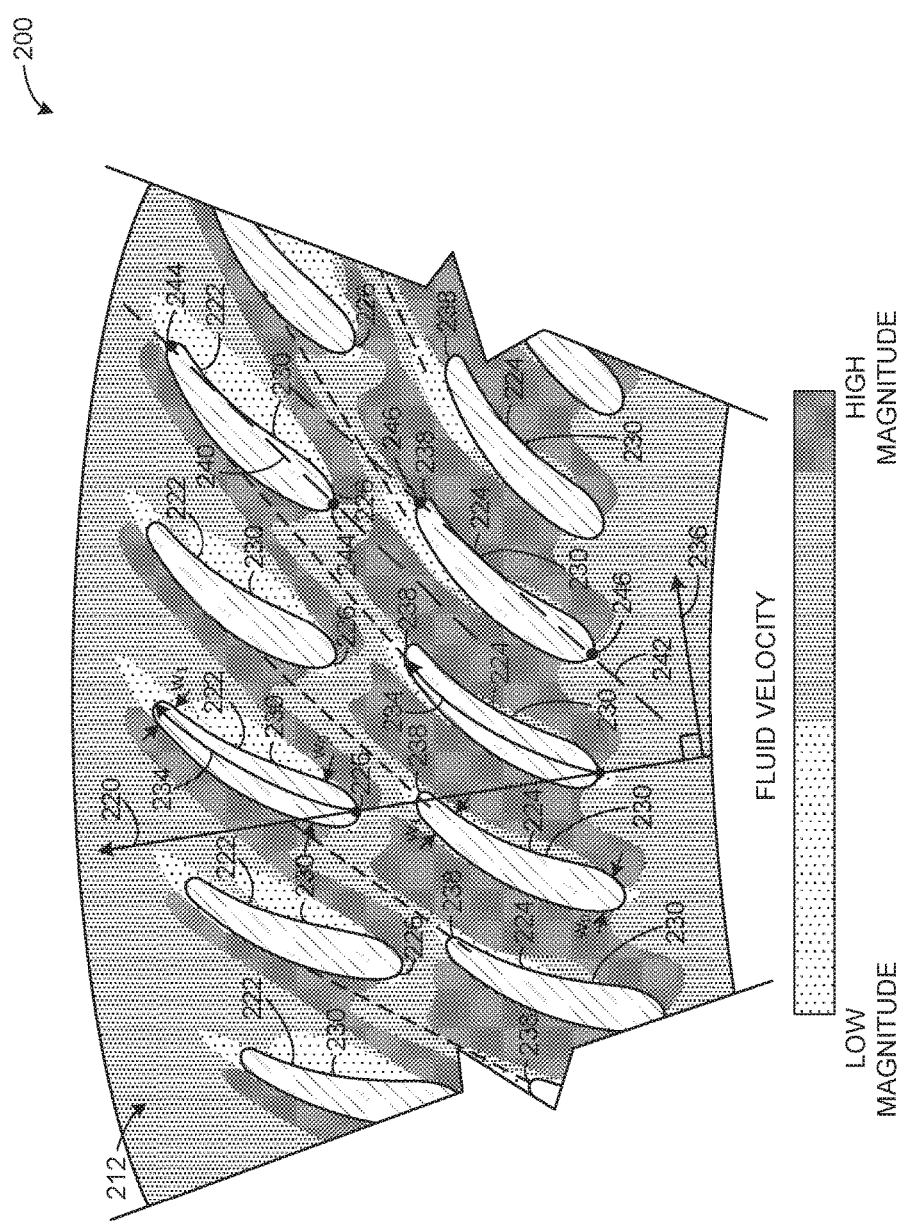

In some examples, at least some of the fins 212 (e.g., one or more of the first fins 222 and/or the second fins 224) are curved to provide concave sides 230 and/or convex sides 232, which may be defined by a general curve and/or one or more unique curves, which is explained in greater detail below in connection with FIG. 3. FIG. 2D illustrates an additional cross-sectional view of the brake rotor apparatus 200 of FIGS. 2A and 2B and shows the fins 212 having a general curve 234. For example, this general curve 234 can be provided by a portion of an arc (e.g., of a circle and/or an ellipse, etc.) and/or defined by one or more functions or equations and/or any other suitable mathematical formula or relationship. In any case, the general curve 234 can be different for at least some of the fins 212. In this example, each of the fins 212 has the same general curve 234. Additionally or alternatively, in this example, each of the concave sides 230 faces a direction 236 perpendicular to the radial line 220. In other examples, at least some of concave sides 230 face in the direction 236 while the other of the concave sides 230 face opposite to the direction 236. For example, each of the concave sides 230 of the second fins 224 can face the direction 236 while each of the concave sides 230 of the first fins 222 face opposite to the direction 236. In some examples, at least some of the fins 212 are tapered. For example, each of the fins 212 has a width that decrease along the radial line 220 and/or along a radial outward direction relative to the brake rotor apparatus 200, as represented by $w_0$ and $w_1$ where $w_1 < w_0$ in FIG. 2D.

In some examples, as illustrated in FIG. 2D, outer ends 238 of the second fins 224 point (as represented by the dashed lines in FIG. 2D) between the inner ends 226 of the first fins 222 and/or, more generally, between the first fins 222. In this example, the first fins 222 and the second fins 224 extend along respective axes 240, 242. That is, each of the first fins 222 has an axis 240 extending through a respective pair of end points 244 associated with each of the first fins 222. In this example, only one axis 240 is depicted. Similarly, each of the second fins 224 has an axis 242 extending through a respective pair of end points 246 associated with each of the second fins 224. In this example, each of the first fins 222 does not share the axis 240 with any of the second fins 224 (i.e., the first fins 222 are not aligned with the second fins 224). Similarly, in this example, each of the second fins 224 does not share the axis 242 with any of the first fins 222.

Figure 2E:
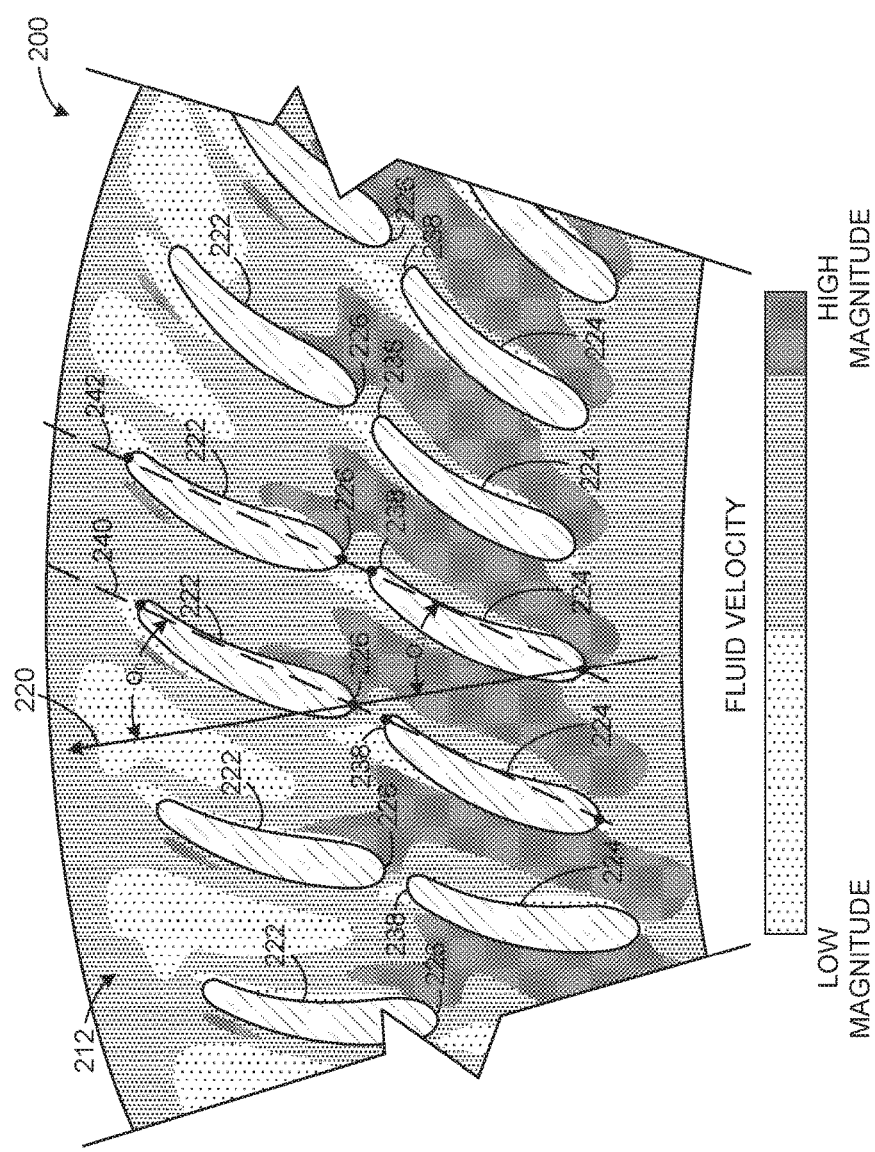

FIG. 2E illustrates an additional cross-sectional view of the brake rotor apparatus 200 of FIGS. 2A and 2B and shows the fins 212 extending along their respective axes 240, 242. In this example, each of the first fins 222 shares the same axis 240 with a respective second fin 224 (i.e., the first fins 222 are aligned with the second fins 224). Similarly, each of the second fins 224 shares the axis 242 with a respective first fin 222.

In this example, each of the first fins 222 provides a first angle (as represented by $\theta_0$ in FIG. 2E) between the respective axis 240 and the radial line 220. Each of the second fins 224 provides a second angle (as represented by $\theta_1$ in FIG. 2E) with their axis 242. In some examples, each of the first angles and/or the second angles are the same relative to each other. In other examples, at least some of the first angles and/or the second angles are different relative to each other. In the illustrated example of FIG. 2E, the first angle and the second angle have a value of 30 degrees. In other examples, either or both of the first angle and/or the second angle can have a value greater than or less than 30 degrees and/or, more generally, can have any suitable value necessary to optimize the fluid flow across the fins 212. Additionally or alternatively, in this example, outer ends 238 of the second fins 224 point directly at respective inner ends 226 of the first fins 222.

In some examples, as mentioned above, at least some of the fins 212 face a different direction relative to the other of the fins 212. FIG. 2F illustrates an additional cross-sectional view of the example brake rotor apparatus 200 of FIGS. 2A and 2B and shows at least some of the fins 212 facing different directions relative to the other of the fins 212. In this example, each of the first fins 222 is facing opposite to the direction 236 and/or opposite to the second fins 224. In some examples, at least some of the first fins 222 face opposite to the direction 236 and/or to at least some of the second fins 224.

Figure 2G:
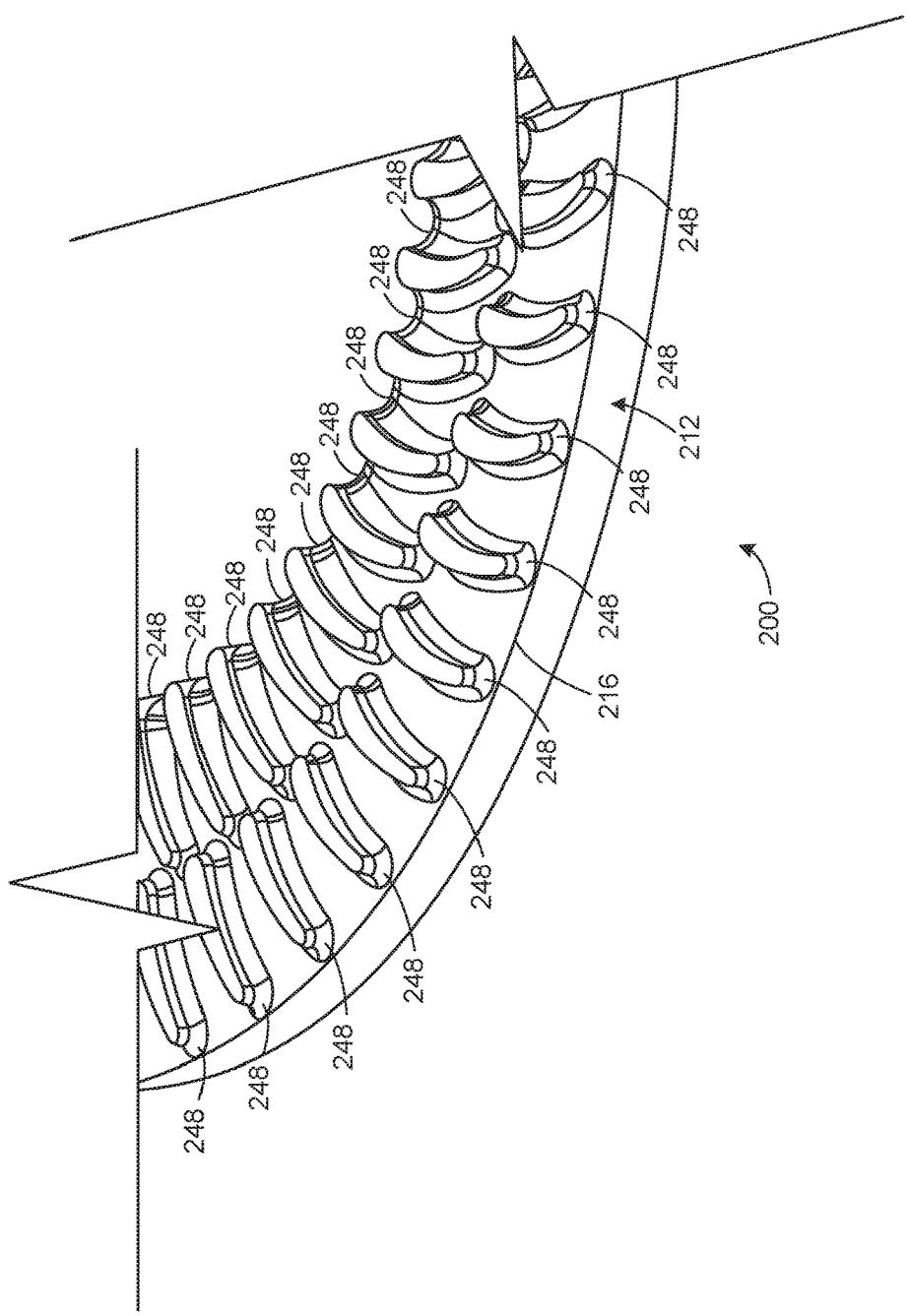
FIG. 2G illustrates another cross-sectional view of the example brake rotor apparatus of FIGS. 2A and 2B.

FIG. 2G illustrates another cross-sectional view of the brake rotor apparatus 200 of FIGS. 2A and 2B and shows fillets 248 surrounding the fins 212 between the surfaces of the fins 212 and the brake rotor apparatus 200. In some such examples, the fillets 248 are configured to direct and/or facilitate airflow onto the surfaces of the fins 212 (e.g., onto the convex sides and/or the concave sides of the fins 212), which may increase a magnitude of the convection heat transfer coefficient associated with the fins 212. In this example, some of the fillets 248 are adjacent the peripheral edge(s) 216 of the brake rotor apparatus 200 and/or partially define the peripheral edge(s) 216. These fillets 248 can be defined by a radius (e.g., 1 millimeter, 5 millimeters, 10 millimeters, etc.), which can be the same for each of the fins 212 or different for at least some of the fins 212.

Figure 3:
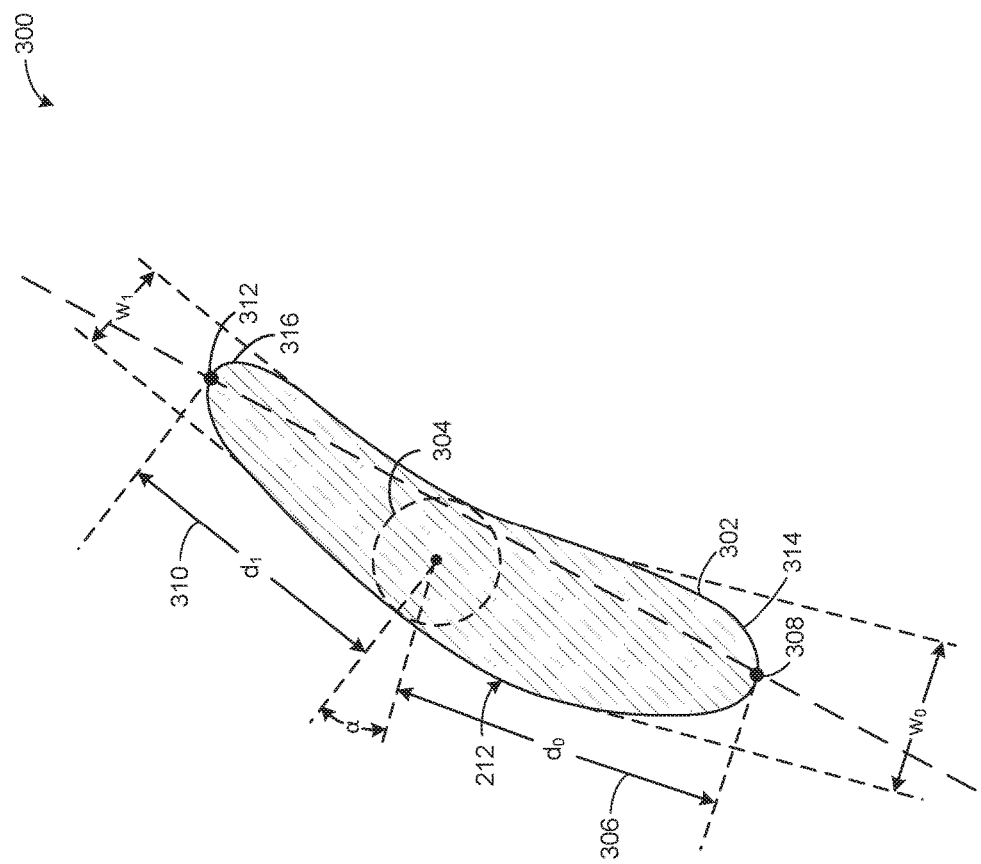
FIG. 3 illustrates a detailed view of an example fin configuration to implement the example brake rotor apparatus of FIGS. 2A and 2B in accordance with the teachings of this disclosure.

FIG. 3 illustrates an example fin configuration 300 to implement one or more of the fins 212 of the example brake rotor apparatus 200 (not shown) of FIGS. 2A and 2B. In particular, FIG. 3 illustrates parameters associated with one or more of the fins 212 that can be changed and/or optimized for a specific type of vehicle. In this example, the example fin configuration 300 is depicted for one of the fins 212. In other examples, the example fin configuration 300 can be advantageously used with more than one and/or each of the fins 212.

The example fin configuration 300 includes a profile 302 surrounding the example fin 212. In some examples, this profile 302 can be implemented with any suitable known airfoil profile. In some examples, the profile 302 implements known airfoil profiles associated with the National Advisory Committee for Aeronautics (NACA) such as, for example, a four-digit series airfoil (e.g., cambered and/or symmetrical), a 5-digit series airfoil, etc. In other examples, the profile 302 implements known airfoil profiles associated with the National Aeronautics and Space Administration (NASA) such as, for example, a GA(W)-2 airfoil (i.e., a NASA LS(1)-0413 airfoil). In other examples, the profile 302 implements any other known and/or suitable airfoil profiles, such as the P-51 Root, etc.

Additionally or alternatively, in this example, the profile 302 is at least partially defined by a circle 304 having a radius. In this example, the radius of the circle 304 is 2.5 millimeters. However, any other radius may be used. The example configuration 300 includes a first distance (as represented by $d_0$ in FIG. 3) extending along a first line 306 provided between a center of the circle 304 and an inner endpoint 308 of the example fin 212. In this example, the first distance is 14 millimeters. The example configuration 300 includes a second distance (as represented by $d_1$ in FIG. 3) extending along a second line 310 provided between the center of the circle 304 and an outer endpoint 312 of the example fin 212. In some examples, the first distance and the second distance are the same. In this example, the second distance is smaller than the first distance. Additionally, distances other than those disclosed in this example may be used. In the illustrated example of FIG. 3, the first line 306 has a different orientation relative to the second line 310 to provide an angle (as represented by α in FIG. 3) between the first line 306 and the second line 310. In some examples, the angle can have any suitable value (e.g., 1 degree, 5 degrees, 10 degrees, etc.). In this example, the angle is 11 degrees.

In the illustrated example of FIG. 3, the example configuration 300 includes a first arc and/or ellipse 314 provided at or near the inner endpoint 308 of the example fin 212. Additionally or alternatively, the example configuration 300 includes a second arc and/or ellipse 316 provided at or near the outer endpoint 312. In this example, the first arc and/or ellipse 314 at least partially defines the inner endpoint 308 and/or the profile 302 of the example fin 212. The second arc and/or ellipse 316 at least partially defines the outer endpoint 312 and/or the profile 302 of the example fin 212. The first arc and/or ellipse 314 has a first width (as represented by $w_0$ in FIG. 3) and the second arc and/or ellipse 316 has second width (as represented by $w_1$ in FIG. 3). In this example, the first width is larger than the second width. In some examples, the first width and/or the second width can have any suitable size.

While an example manner of implementing the example apparatus of FIG. 1 is illustrated in FIGS. 2A, 2B, 2C, 2D, 2E, 2F, 2G and 3, one or more of the elements, processes and/or devices illustrated in FIGS. 2A, 2B, 2C, 2D, 2E, 2F, 2G and 3 may be combined, divided, re-arranged, omitted, eliminated and/or implemented in any other way.

As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

From the foregoing, it will be appreciated that the above disclosed apparatus increase and/or optimize heat transfer or dissipation experienced by a brake rotor (e.g., the brake rotor apparatus 200 and/or one or more of the brake rotors 106) during braking operations and/or while the brake rotor rotates, which can provide a relatively low temperature of the brake rotor during use and/or can cool or reduce a temperature of the brake rotor at a rate that would have otherwise been unattainable using conventional brake rotor systems.

Some disclosed examples provide fins coupled to the brake rotor and disposed between braking surfaces of the brake rotor. In some examples, first fins are distributed along a first radius of the brake rotor and extend radially outward. Second fins are distributed along a second radius of the brake rotor, smaller than the first radius, and adjacent the first fins. In other examples, the first fins are disposed between the braking surfaces adjacent a peripheral edge of the brake rotor and configured to direct airflow radially outward from a rotational axis of the brake rotor. In some such examples, the second fins are radially offset relative to the first fins and configured to direct the airflow between the first fins. One or more of the first fins may extend partially between a respective pair of the second fins. In some examples, configurations and/or orientations of the fins can be advantageously changed or altered to optimize airflow through the brake rotor and/or onto the fins.

In some disclosed examples, the first fins and/or the second fins are curved to provide a concave side of each fin that faces a direction perpendicular to a radius of the brake rotor. In such examples, the fins can include a fillet provided between the fins (e.g., the concave side of the fins) and the brake rotor, which can direct airflow onto the fin while the brake rotor rotates. In other disclosed examples, the first fins and/or the second fins are tapered such that each of the first fins and/or the second fins can include a width that decreases along a radially outward direction.

Although certain example apparatus have been disclosed herein, the scope of coverage of this patent is not limited thereto. On the contrary, this patent covers all apparatus fairly falling within the scope of the claims of this patent.

What is claimed is:

1. An apparatus comprising:
   a brake rotor having braking surfaces;
   first fins disposed between the braking surfaces, the first fins distributed along a first circumference defined by a first radius of the brake rotor, the first fins extending radially outward, each of the first fins including a first inner end, a first outer end located radially opposite the first inner end, and a first axis extending through the first inner end and the first outer end; and
   second fins disposed between the braking surfaces, the second fins separated from the first fins and distributed along a second circumference defined by a second radius of the brake rotor smaller than the first radius, the second fins extending radially outward, each of the second fins including a second inner end, a second outer end located radially opposite the second inner end, and a second axis extending through the second inner end and the second outer end, each of the second axes of the second fins being colinear with a corresponding one of the first axes of the first fins and being oriented at a non-parallel angle relative to a radial line extending from a rotational axis of the brake rotor through the second inner end of the second fin.

2. The apparatus of claim 1, wherein the first fins and the second fins are curved.

3. The apparatus of claim 2, wherein each of the first fins and the second fins includes a concave side facing a direction associated with the brake rotor rotating relative to the rotational axis.

4. The apparatus of claim 3, further including a fillet disposed between the concave side and the brake rotor and configured to direct the airflow onto the concave side.

5. The apparatus of claim 1, wherein the second outer ends of the second fins do not extend radially outward beyond the first inner ends of the first fins.

6. The apparatus of claim 1, wherein the first fins and the second fins are tapered.

7. The apparatus of claim 6, wherein each of the first fins and the second fins includes a width that decreases along a radially outward direction.

8. The apparatus of claim 1, wherein the first fins are equally spaced about the first circumference by a first spacing and the second fins are equally spaced about the second circumference by a second spacing, the first spacing larger than the second spacing.

9. An apparatus comprising:
   a brake rotor having braking surfaces;
   first fins coupled to the brake rotor and disposed between the braking surfaces, the first fins distributed along a first circumference defined by a first radius of the brake rotor, the first fins extending radially outward, each of the first fins including a first inner end, a first outer end located radially opposite the first inner end, a first continuously-concave side located between the first inner end and the first outer end, and a first continuously-convex side located between the first inner end and the first outer end circumferentially opposite the first continuously-concave side, each of the first continuously-concave sides facing in a first circumferential direction about the first circumference, each of the first continuously-convex sides facing in a second circumferential direction about the first circumference, the second circumferential direction being opposite the first circumferential direction; and second fins coupled to the brake rotor and disposed between the braking surfaces, the second fins distributed along a second circumference defined by a second radius of the brake rotor smaller than the first radius, the second fins extending radially outward, each of the second fins including a second inner end, a second outer end located radially opposite the second inner end, a second continuously-concave side located between the second inner end and the second outer end, and a second continuously-convex side located between the second inner end and the second outer end circumferentially opposite the second continuously-concave side, each of the second continuously-concave sides facing in the second circumferential direction, each of the second continuously-convex sides facing in the first circumferential direction.

10. The apparatus of claim 9, wherein the second outer ends of the second fins do not extend radially outward beyond the first inner ends of the first fins.

11. The apparatus of claim 9, wherein the first fins or the second fins are tapered.

12. The apparatus of claim 9, wherein the first fins are equally spaced about the first circumference by a first spacing and the second fins are equally spaced about the second circumference by a second spacing, the first spacing larger than the second spacing.

* * * * *